US012298418B2

(12) United States Patent
Neal

(10) Patent No.: US 12,298,418 B2
(45) Date of Patent: May 13, 2025

(54) WEARABLE SECURITY ALARM DEVICE AND ALERTING SYSTEM

(71) Applicant: Truist Bank, Charlotte, NC (US)

(72) Inventor: Jinea Deanitra Neal, Glen Burnie, MD (US)

(73) Assignee: TRUIST BANK, Charlotte, NC (US)

(*) Notice: Subject to any disclaimer, the term of this patent is extended or adjusted under 35 U.S.C. 154(b) by 255 days.

(21) Appl. No.: 17/721,291

(22) Filed: Apr. 14, 2022

(65) Prior Publication Data
US 2023/0333196 A1 Oct. 19, 2023

(51) Int. Cl.
H04W 4/029 (2018.01)
G01S 5/02 (2010.01)
G06F 1/16 (2006.01)
G08B 21/02 (2006.01)
G08B 25/00 (2006.01)
G08B 25/01 (2006.01)
G08B 25/10 (2006.01)
G08B 25/12 (2006.01)
H04W 4/021 (2018.01)
H04W 4/90 (2018.01)

(52) U.S. Cl.
CPC ............ *G01S 5/0231* (2013.01); *G06F 1/163* (2013.01); *G08B 21/02* (2013.01); *G08B 25/001* (2013.01); *G08B 25/016* (2013.01); *G08B 25/10* (2013.01); *G08B 25/12* (2013.01); *H04W 4/021* (2013.01); *H04W 4/029* (2018.02); *H04W 4/90* (2018.02)

(58) Field of Classification Search
CPC ....... G01S 5/0231; H04W 4/029; H04W 4/90; H04W 4/021; G06F 1/163; G08B 21/02; G08B 25/001; G08B 25/016; G08B 25/10; G08B 25/12
See application file for complete search history.

(56) References Cited

U.S. PATENT DOCUMENTS

| 10,540,883 | B1* | 1/2020 | Keil | G10L 25/51 |
| 11,138,858 | B1* | 10/2021 | Segal | G08B 25/014 |
| 2013/0021154 | A1* | 1/2013 | Solomon | G16H 80/00 340/539.12 |
| 2014/0274225 | A1* | 9/2014 | Lacatus | H04W 52/0241 455/574 |
| 2016/0174158 | A1* | 6/2016 | Vance | H04W 8/22 455/418 |
| 2017/0229004 | A1* | 8/2017 | Shah | G08B 15/02 |
| 2019/0147138 | A1* | 5/2019 | Jaiswal | G16H 50/20 705/2 |
| 2021/0020020 | A1* | 1/2021 | Rothschild | G08B 21/0453 |

(Continued)

*Primary Examiner* — Dai Phuong
(74) *Attorney, Agent, or Firm* — Michael A. Springs, Esq.; Shumaker, Loop & Kendrick, LLP; Patrick B. Horne

(57) ABSTRACT

A wearable device detects a security incident and initiates an alarm protocol. The wearable receives user input via the user interface indicating that the user is under duress; confirms that the user is under duress by receiving initial confirmatory user input via the user interface; determines a location of the user using the location device; and in response to receiving confirmation that the user is under duress, transmits a duress signal to an emergency system across a wireless network connection, the duress signal indicating that the user is under duress and indicating the location of the user, whereby the emergency system is configured to alert police and/or security of the security incident.

22 Claims, 6 Drawing Sheets

(56) References Cited

U.S. PATENT DOCUMENTS

| | | | |
|---|---|---|---|
| 2022/0087899 A1* | 3/2022 | Yen | A61H 31/005 |
| 2022/0198902 A1* | 6/2022 | Yao | G08B 21/043 |
| 2022/0358827 A1* | 11/2022 | Hansen | H04W 4/021 |
| 2023/0127315 A1* | 4/2023 | Randall | H04W 4/90 |
| | | | 455/404.2 |

* cited by examiner

WEARABLE SECURITY ALARM DEVICE AND ALERTING SYSTEM

FIELD

This invention relates generally to the field of security systems, and more particularly embodiments of the invention relate to wearable security alarm and alerting systems.

BACKGROUND

Historically, alarm systems for institutions such as banking institutions are made up of the proverbial button-under-the-counter, which when triggered calls for help. This configuration does not keep safe entity teammates when they are not within arm's reach of the button. Therefore, a need exists for a mobile security triggering device to be worn by entity teammates at all times.

BRIEF SUMMARY

Embodiments of the present invention address the above needs and/or achieve other advantages by providing apparatuses and methods that detect a security incident and initiate an alarm protocol.

Embodiments of the invention are directed to a wearable device configured for being worn on a body of a user and detecting a security incident and initiating an alarm protocol. The wearable device includes a processing device; a communication device operatively coupled with the processing device; a user interface operatively coupled with the processing device; a location device operatively coupled with the processing device; a memory device operatively coupled with the processing device, the memory device comprising a non-transitory computer-readable storage comprising executable instructions that when executed by the processing device, cause the processing device to receive user input via the user interface indicating that the user is under duress; confirm that the user is under duress by receiving initial confirmatory user input via the user interface; determine a location of the user using the location device; and in response to receiving confirmation that the user is under duress, transmit a duress signal to an emergency system across a wireless network connection, the duress signal indicating that the user is under duress and indicating the location of the user, whereby the emergency system is configured to alert police and/or security of the security incident.

In some embodiments, the executable instructions further cause the processing device to confirm that the user is under duress by receiving initial confirmatory user input; requesting further confirmatory user input from the user via the user interface; receiving further confirmatory user input from the user via the user interface; in response to receiving the further confirmatory user input from the user, confirming that the user is under duress.

In some embodiments, receiving user input via the user interface indicating that the user is under duress comprises receiving user tactile input pressing a button a first instance. In some such embodiments, receiving initial confirmatory user input via the user interface indicating that the user is under duress comprises receiving user tactile input pressing the button at least one additional instance within a predetermined time period of the first instance.

In some of these embodiments, receiving further confirmatory user input from the user comprises receiving user tactile input pressing the button at least one third time.

In others of these embodiments, receiving further confirmatory user input from the user comprises receiving no user tactile input within a predetermined period of time after the request for further confirmatory user input.

In some embodiments, the executable instructions further cause the processing device to automatically cause the wearable device to enter awake mode at a predetermined morning time; and automatically cause the wearable device to enter sleep mode at a second predetermined evening time.

In some embodiments, the executable instructions further cause the processing device to periodically or in real-time determine the location of the wearable device using the GPS device; automatically cause the wearable device to enter awake mode when the wearable device moves within a geofenced area of interest; and automatically cause the wearable device to enter sleep mode when the wearable device moves outside the geofenced area of interest.

According to embodiments of the invention, a wearable device configured for being worn on a body of a user and detecting a security incident and initiating an alarm protocol, the wearable device comprising a processing device; a communication device operatively coupled with the processing device; a user interface operatively coupled with the processing device; a location device operatively coupled with the processing device; a memory device operatively coupled with the processing device, the memory device comprising a non-transitory computer-readable storage comprising executable instructions that when executed by the processing device, cause the processing device to: receive user input via the user interface indicating that the user is under duress; request confirmation from the user indicating whether the user in under duress or not via the user interface; determine a location of the user using the location device; receive user input via the user interface either confirming the user is under duress or denying the user is under duress; wherein the processing device is configured to in response to receiving user input confirming that the user is under duress, transmit a duress signal to an emergency system across a wireless network connection, the duress signal indicating that the user is under duress and indicating the location of the user; and in response to receiving user input denying that the user is under duress, standing down without transmitting the duress signal, whereby the emergency system is configured to alert police and/or security of the security incident.

In some embodiments, receiving user input via the user interface indicating that the user is under duress comprises receiving user tactile input pressing a button three times within a predetermined time period. In some such embodiments, receiving confirmatory user input via the user interface indicating that the user is under duress comprises receiving user tactile input pressing the button a second three times within a second predetermined time period after the request.

In some embodiments, receiving user input denying the user is under duress comprises receiving user tactile input pressing a second button a second three times within a second predetermined time period after the request.

In some embodiments, receiving user input via the user interface either confirming the user is under duress or denying the user is under duress comprises: within a predetermined period of time after the request, determining whether the user pressed the button a second three times or whether the user pressed another button three times; wherein the processing device is configured to: if the user pressed the button a second three times within the predetermined period of time, transmit the duress signal and if the user pressed the other button three times within the predetermined period of time, standing down without transmitting the duress signal.

In some embodiments, the executable instructions further cause the processing device to: automatically cause the wearable device to enter awake mode at a predetermined morning time; and automatically cause the wearable device to enter sleep mode at a second predetermined evening time.

In some embodiments, the executable instructions further cause the processing device to: periodically or in real-time determine the location of the wearable device using the location device; automatically cause the wearable device to enter awake mode when the wearable device moves within a geofenced area of interest; and automatically cause the wearable device to enter sleep mode when the wearable device moves outside the geofenced area of interest.

According to embodiments of the invention, a method for alerting an emergency system when a user wearing a wearable device is under duress includes receiving user input via a user interface of the wearable device indicating that the user is under duress; requesting confirmation from the user indicating whether the user in under duress or not via the user interface; determining a location of the user using a location device of the wearable device; receiving user input via the user interface either confirming the user is under duress or denying the user is under duress; in response to receiving user input confirming that the user is under duress, transmitting, a duress signal to an emergency system from the wearable device and across a wireless network connection, the duress signal indicating that the user is under duress and indicating the location of the user, whereby the emergency system is configured to alert police and/or security of the security incident; and in response to receiving user input denying that the user is under duress, standing down without transmitting the duress signal.

In some embodiments, receiving user input via the user interface indicating that the user is under duress comprises receiving user tactile input pressing a button three times within a predetermined time period. In some such embodiments, receiving confirmatory user input via the user interface indicating that the user is under duress comprises receiving user tactile input pressing the button a second three times within a second predetermined time period after the request.

In other such embodiments, receiving user input denying the user is under duress comprises receiving user tactile input pressing a second button a second three times within a second predetermined time period after the request.

In yet other such embodiments, receiving user input via the user interface either confirming the user is under duress or denying the user is under duress comprises: within a predetermined period of time after the request, determining whether the user pressed the button a second three times or whether the user pressed another button three times; if the user pressed the button a second three times within the predetermined period of time, transmitting the duress signal and if the user pressed the other button three times within the predetermined period of time, standing down without transmitting the duress signal.

In some embodiments, the method also includes automatically causing, by a processing device of the wearable device, the wearable device to enter awake mode at a predetermined morning time; and automatically causing, by a processing device of the wearable device, the wearable device to enter sleep mode at a second predetermined evening time.

In some embodiments, the method also includes periodically or in real-time determining the location of the wearable device using the location device; automatically causing, by a processing device of the wearable device, the wearable device to enter awake mode when the wearable device moves within a geofenced area of interest; and automatically causing, by a processing device of the wearable device, the wearable device to enter sleep mode when the wearable device moves outside the geofenced area of interest.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
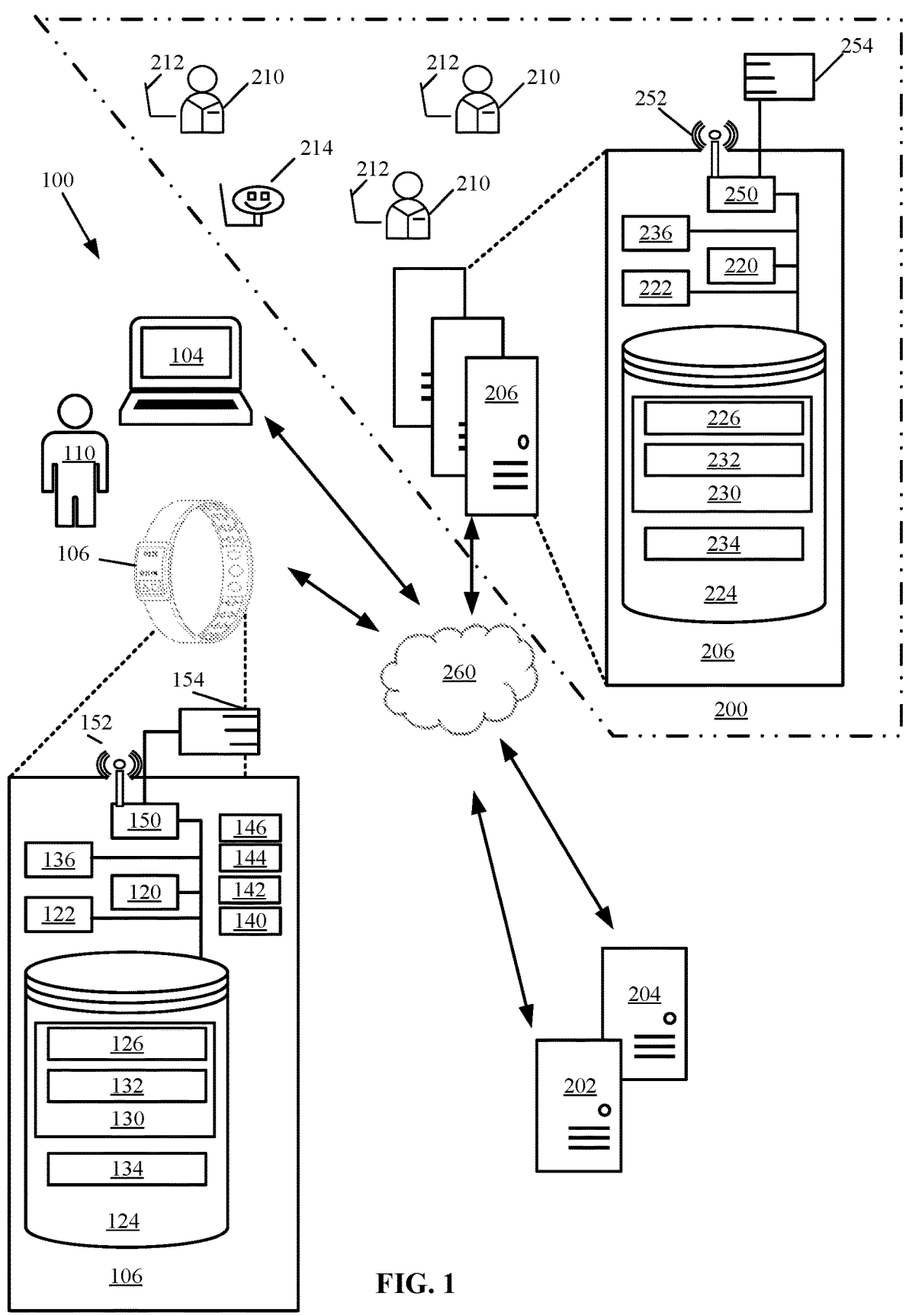
Figure 2:
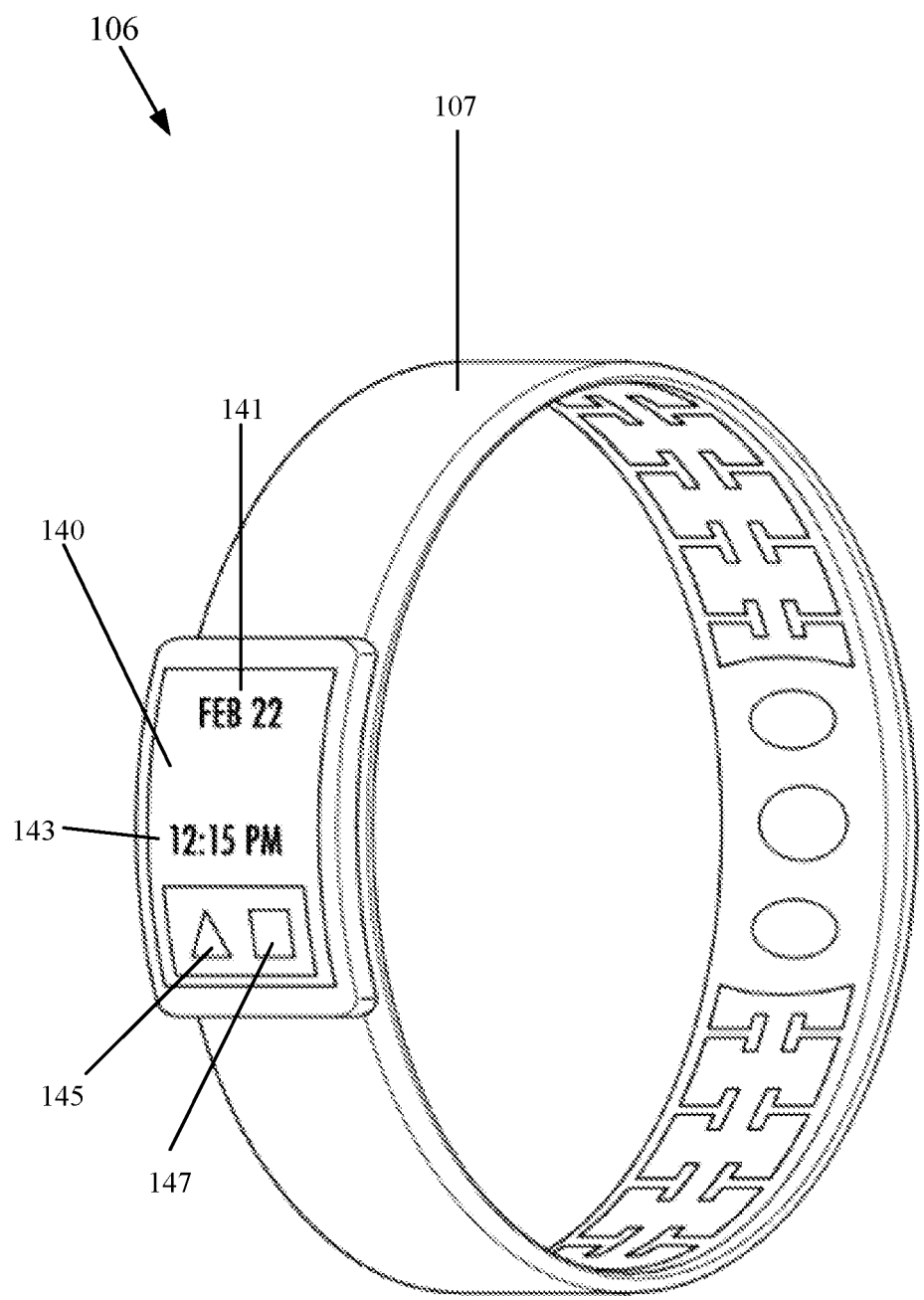
Figure 3:
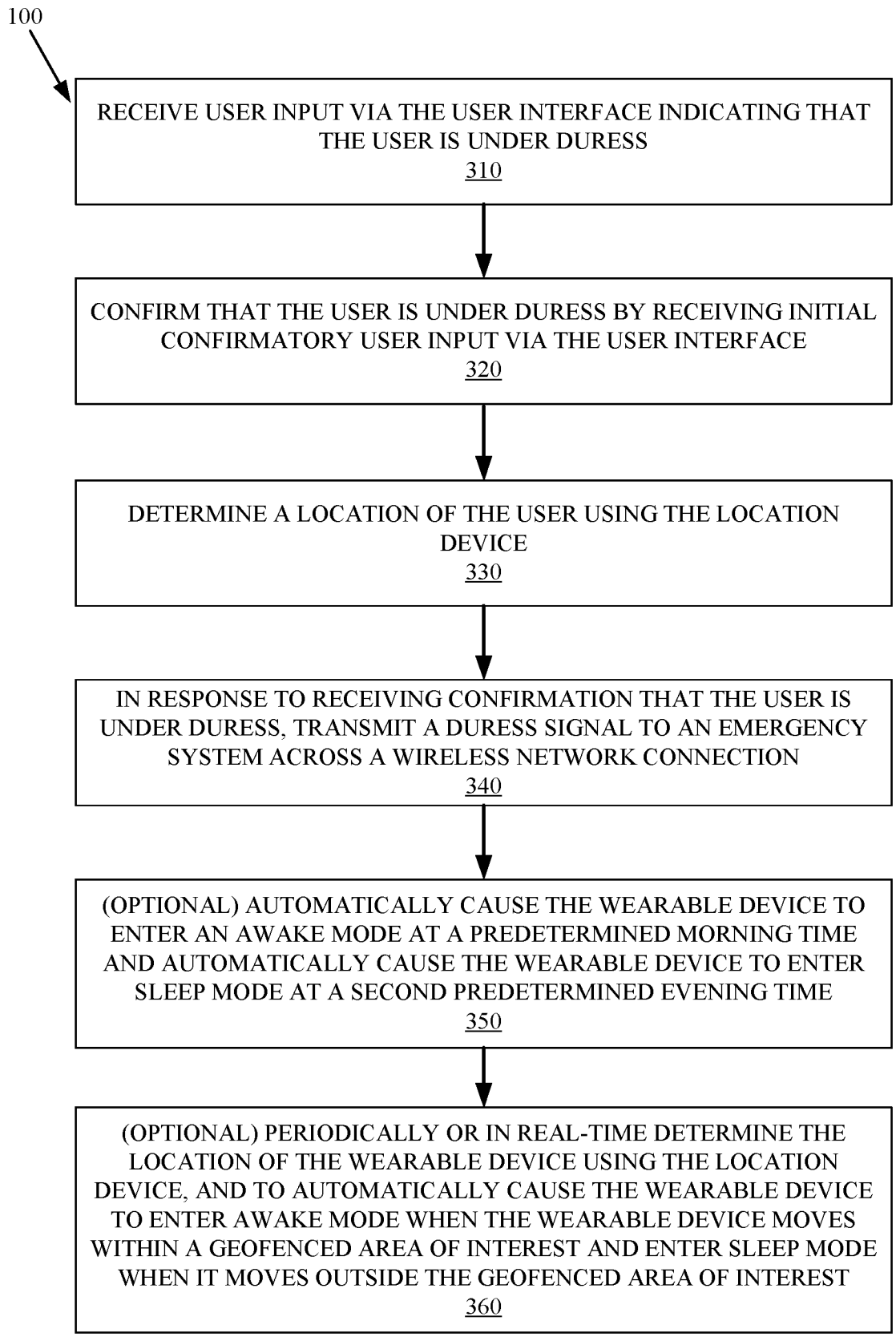
Figure 4:
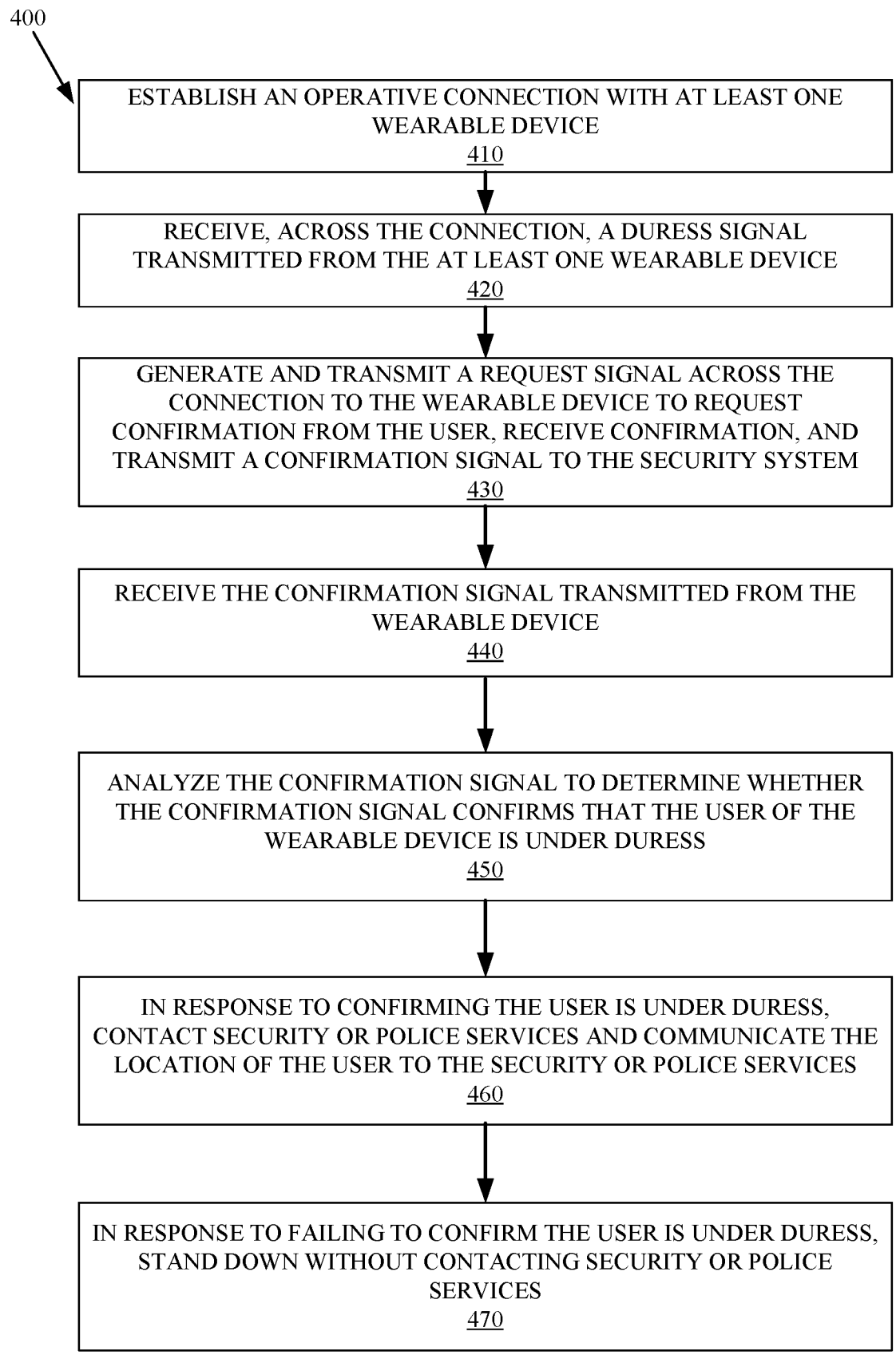
Figure 5:
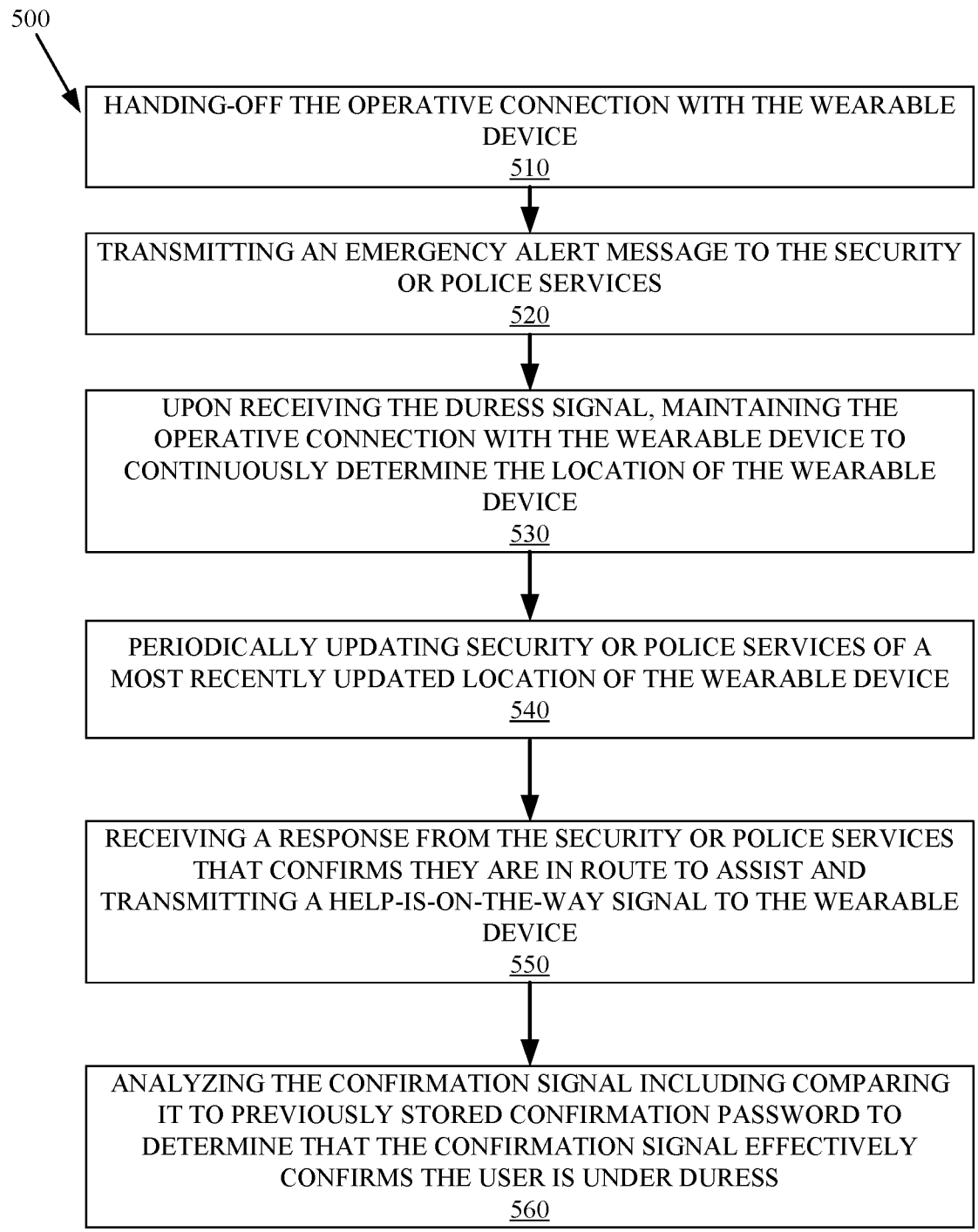
Figure 6:
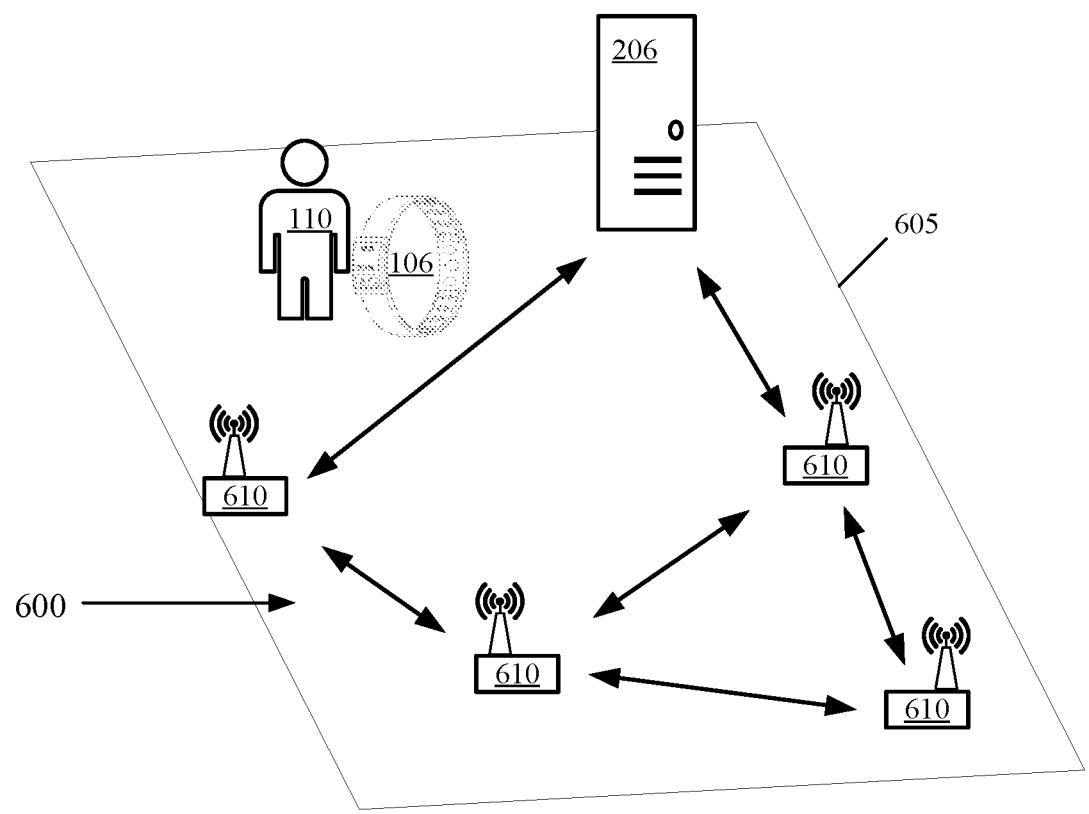

Having thus described embodiments of the invention in general terms, reference will now be made to the accompanying drawings, wherein:

FIG. 1 illustrates an environment in which the wearable device and alerting system operate, in accordance with one embodiment of the present invention;

FIG. 2 illustrates a wearable device in accordance with one embodiment of the present invention;

FIG. 3 illustrates a method for alerting an emergency system when a user wearing a wearable device is under duress in accordance with one embodiment of the present invention;

FIG. 4 illustrates a method for alerting an emergency system when a user wearing a wearable device is under duress in accordance with one embodiment of the present invention;

FIG. 5 illustrates a method for alerting an emergency system when a user wearing a wearable device is under duress in accordance with one embodiment of the present invention; and FIG. 6 illustrates a configuration of a security system and network of wearable user devices in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the described embodiments can be configured without departing from the scope and spirit of the invention. Therefore, it is to be understood that, within the scope of the appended claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user device, illustrated in separate examples as a wearable device 106 and a computing device 104, which may be, as non-limiting examples, a smart phone, a portable digital assistant (PDA), a pager, a mobile television, a gaming device, a laptop computer, a camera, a video recorder, an audio/video player, radio, a GPS device, any combination of the aforementioned, or other portable device with processing and communication capabilities.

Embodiments of the invention provide a wearable device 106 may be or include a watch, wristband, or ring, and is configured to detect a security incident and initiate an alarm protocol. The wearable device receives user input via the user interface indicating that the user is under duress; confirms that the user is under duress by receiving initial confirmatory user input via the user interface; determines a location of the user using the location device; and in response to receiving confirmation that the user is under duress, transmits a duress signal to an emergency system across a wireless network connection, the duress signal indicating that the user is under duress and indicating the location of the user, whereby the emergency system is configured to alert police and/or security of the security incident.

Embodiments also provide a security system that detects a security incident and initiates an alarm protocol by real-time interaction with a network of wearable devices worn by users. The security system includes an emergency system to establish an operative connection comprising at least one wireless connection with at least one of a plurality of wearable devices; receive, across the operative connection, a duress signal transmitted from the at least one wearable device, the duress signal indicating that the user wearing the at least one wearable device is under duress and indicating a location of the user; generate and transmit a request signal across the operative connection to the at least one wearable device configured to cause the at least one wearable device to request confirmation from the user, receive confirmation from the user, and transmit a confirmation signal across the operative connection to the security system; receive, across the operative connection, the confirmation signal transmitted from the at least one wearable device; analyze the confirmation signal to determine whether the confirmation signal confirms that the user of the at least one wearable device is under duress; in response to confirming the user is under duress, contact security or police services and communicate at least the location of the user to the security or police services; and in response to failing to confirm the user is under duress, stand down without contacting security or police services.

In the illustrated example, the wearable device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the computing device 104 may be or include a workstation, a server, or any other suitable device, including a set of servers, a cloud-based application or system, or any other suitable system, adapted to execute, for example any suitable operating system, including Linux, UNIX, Windows, and any known other operating system used on personal computer, central computing systems, phones, and other devices.

The user 110 can be an individual, a group, or any entity in possession of or having access to the user device, referring to either or both of the wearable device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the wearable device 106, includes components such as, at least one each of a processing device 120, and a memory device 122 for processing use, such as random access memory (RAM), and read-only memory (ROM). The illustrated wearable device 106 further includes a storage device 124 including at least one a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the wearable device 106 described herein. For example, the memory device 122 may include such applications as a conventional web browser application. These applications also typically provide a graphical user interface (GUI) on the display 140 that allows the user 110 to communicate with the wearable device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application.

The processing device 120, and other processors described herein, generally include circuitry for implementing communication and/or logic functions of the wearable device 106. For example, the processing device 120 may include a digital signal processor, a microprocessor, and various analog to digital converters, digital to analog converters, and/or other support circuits. Control and signal processing functions of the wearable device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122. For example, the processing device 120 may be capable of operating a connectivity program, such as a web browser application. The web browser application may then allow the wearable device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device or are in communication with the user device to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied herein. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The wearable device 106, as illustrated and in various embodiments, includes an input and output system 136, referring to, including, or operatively communicating with, user input devices and user output devices which are operatively coupled to the processing device 120. The user output devices include a display 140 (e.g., a liquid crystal display or the like), which can be, as a non-limiting example, a touch screen of the wearable device 106, which serves both as an output device, by providing graphical and text indicia and presentations for viewing by one or more user 110, and as an input device, by providing virtual buttons, selectable options, a virtual keyboard, and other indicia that, when touched, control the wearable device 106 by user action. The user output devices include a speaker 144 or other audio device. The user input devices, which allow the wearable device 106 to receive data and actions such as button manipulations and touches from a user such as the user 110, may include any of a number of devices allowing the wearable device 106 to receive data from a user, such as a keypad, keyboard, touch-screen, touchpad, microphone 142, mouse, joystick, other pointer device, button (such as button 145 or button 147 shown in FIG. 2), soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a wearable device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The wearable device 106 may also include a location or positioning device 108, which can be for example a global positioning system device (GPS) configured to be used by a positioning system to determine a location of the wearable device 106. For example, the positioning system device 108 may include a GPS transceiver. In some embodiments, the positioning system device 108 includes up an antenna, transmitter, and receiver. For example, in one embodiment, triangulation of cellular signals may be used to identify the approximate location of the wearable device 106. In other embodiments, the positioning device 108 includes a proximity sensor or transmitter, such as an RFID tag, that can sense or be sensed by devices known to be located proximate a merchant or other location to determine that the consumer wearable device 106 is located proximate these known devices.

In the illustrated example, a system intraconnect 138, connects, for example electrically, the various described, illustrated, and implied components of the wearable device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device.

The user device, referring to either or both of the computing device 104 and the wearable device 106, with particular reference to the wearable device 106 for illustration purposes, includes a communication interface 150, by which the wearable device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the wearable device 106 may be configured to operate with one or more air interface standards, communication protocols, modulation types, and access types. By way of illustration, the wearable device 106 may be configured to operate in accordance with any of a number of first, second, third, and/or fourth-generation communication protocols and/or the like. For example, the wearable device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The wearable device 106 may also be configured to operate in accordance with non-cellular communication mechanisms, such as via a wireless local area network (WLAN) or other communication/data networks.

The communication interface 106 may also include a payment network interface. The payment network interface may include software, such as encryption software, and hardware, such as a modem, for communicating information to and/or from one or more devices on a network. For example, the wearable device 106 may be configured so that it can be used as a credit or debit card by, for example, wirelessly communicating account numbers or other authentication information to a terminal of the network.

The wearable device 106 further includes a power source 128, such as a battery, for powering various circuits and other devices that are used to operate the wearable device 106. Embodiments of the wearable device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more user 110. In some examples, an enterprise system 200 offers products. In some examples, an enterprise system 200 offers services. Services and products thus relates to either or both in these descriptions. With regard, for example, to online information and financial services, service and product are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to both the computing device 104 and the agent devices 212.

Agent devices 212 individually or collectively include an input/output system, referring to, including, or operatively communicating with input devices and output devices of the agent devices 212, each of which can include, as a non-limiting example, a touch screen, which serves both as an output by providing graphical and text indicia and presentations for viewing by one or more agent 210, and as an input device by providing virtual buttons, selectable options, a virtual keyboard, and other indicia that when touched control or prompt the agent device 212 by action of the attendant agent 210.

Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 210. Inputs by one or more human agent 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated wearable device 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively communicating with input devices and output devices such as, as a non-limiting example, agent devices 212, which have both input and output capabilities.

In the illustrated example, a system intraconnect 238 electrically connects the various above-described components of the computing system 206. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 240, by which the computing system 206 communicates and conducts transactions with other devices and systems. The communication interface 240 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, and other transceivers. In addition, GPS (Global Positioning System) may be included for navigation and location-related data exchanges, ingoing and/or outgoing. Communications may also or alternatively be conducted via the connector 254 for wired connections such by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, and any known other operating system used on personal computer, central computing systems, phones, and other devices.

The user devices, referring to either or both of the wearable device 106 and computing device 104, the agent devices 212, and the enterprise computing system 206, which may be one or any number centrally located or distributed, are in communication through one or more network, referenced as network 260 in FIG. 1.

Network 260 provides wireless or wired communications among the components of the system 100 and the environment thereof, including other device local or remote to those illustrated, such as additional wearable devices, servers, and other devices communicably coupled to network 260, including those not illustrated in FIG. 1. The network 260 is singly depicted for illustrative convenience, but may include more than one network without departing from the scope of these descriptions. In some embodiments, the network 260 may be or provide one or more cloud-based services or operations. The network 260 may be or include an enterprise or secured network, or may be as implemented at least in part through on or more connections to the Internet. A portion of the network 260 may be a virtual private network (VPN) or an Intranet. The network 260 can include wired and wireless links, including, as non-limiting examples, 802.11a/b/g/n/ac, 802.20, WiMax, LTE, and/or any other wireless link. The network 260 may include any internal or external network, networks, sub-network, and combinations of such operable to implement communications between various computing components within and beyond the illustrated environment 100. The network 260 may communicate, for example, Internet Protocol (IP) packets, Frame Relay frames, Asynchronous Transfer Mode (ATM) cells, voice, video, data, and other suitable information between network addresses. The network 260 may also include one or more local area networks (LANs), radio access networks (RANs), metropolitan area networks (MANs), wide area networks (WANs), all or a portion of the internet and/or any other communication system or systems at one or more locations.

Two external systems 270 and 272 are expressly illustrated in FIG. 1, representing any number and variety of data sources, users, consumers, customers, business entities, banking systems, government entities, clubs, and groups of any size are all within the scope within the scope of the descriptions. In at least one example, the external systems 270 and 272 represent automatic teller machines (ATMs) utilized by the enterprise system 200 in serving users 110.

Referring not to FIG. 2, an illustration of a wearable device 106 according to an embodiment of the invention is shown. The wearable device 106 includes a wristband 107. The display 140 may show date 141 and time 143. Buttons 145 and 147 enable and receive user input. The wearable device 106 may determine a security situation or event is occurring by receiving user input and initiate a security protocol that results in an alert sent to security personnel and/or police. The wearable device may be or include a watch, a wristband, an anklet, or other jewelry or device. In some embodiments, the only information generally displayed is the date and time. Information and access to information is ideally limited so as to minimize a security risk associated with theft or loss of possession by the user of the wearable device 106.

Button 145 may be the color green and button 147 may be the color red or vice versa. The button colored green may be used by the user to provide input that the user is alright, i.e., not in a situation of duress, and the button colored red may be used by the user to provide input that the user is not alright, i.e., is in a situation of duress. For example, the wearable device 106, may receive user input by depressing a button three times, such as receiving three presses of the red button to indicate the user is under duress or three presses of the green button to indicate the user is not under duress. Similarly, if the wearable device 106 is confirming a situation of duress it may receive user input confirming the duress by receiving three presses of the red button again. In some embodiments, the display and/or the face of the device may change color based on whether the user has indicated they are in duress or not. For example, if the user is in duress, the display of the device may be purple and if the user is not in duress, the display of the device is white or grey and white.

In the event a user is held hostage before entering a physical location of an enterprise, such as an employee of a bank branch who is leaving her car to walk into a bank branch, Or in the event an employee is under duress but is not near an alarm pad or alarm button under the counter. Or in the event a bank robber says they will shoot a teller if the teller pulls a dye pack damaging cash being stolen, the wearable device and distributed network of security stations provides a mechanism for alerting security and/or police to the situation inconspicuously without alerting the perpetrator that the user is initiating an alert. In some embodiments, the wearable device 106 provides feedback to the user through vibration, and in some cases, vibration alone is the feedback provided to the user so as to minimize potential communication of information to a perpetrator.

In various embodiments of the wearable device 106, it automatically activates and deactivates at predetermined times of the day, such as at 7:00 AM in the morning and at 7:00 PM in the evening, respectively. In other embodiments, the wearable device automatically activates when the wearable device 106 enters a predetermined geofenced location, which may be defined by proximity of one of a network of distributed security stations. In some cases, the wearable device both is activated and establishes an operable coupling with the nearest security station when the wearable device is within wireless range of the security station. Similarly, when the wearable device moves outside wireless range of all security stations, it may deactivate. In one embodiment, the security stations extend to the parking area or parking lot where the users are parking their cars to walk into work. In certain implementations of the system, every person employed by an entity and coming to work in person is assigned a wearable device, which they wear everyday.

Referring now to FIG. 3, a method for detecting a security incident and initiating an alarm protocol is illustrated generally from the perspective of the wearable device. The first step, as represented by block 310, is to receive user input by a user interface. The user input indicates that the user is under duress. As discussed above, this input may be captured by the user pressing a specific button, such as a red button. The user may be required to press the button multiple times, such as three times, in order to ensure the user did not accidentally depress the button, for example, one time, within a predetermined period of time such as within three seconds.

The next step, as represented by block 320, is to confirm that the user is under duress by receiving initial confirmatory user input using the user interface. This step may require depressing a second button to confirm or pressing the initial button multiple times, in some embodiments multiple times within a predetermined time period such as three seconds.

The next step, as represented by block 330, is to determine a location of the user using the location device of the wearable device. The location may be determined by connection or operative coupling with a proximate security station via Bluetooth, WiFi or other short distance wireless protocol, or by 5G ultra-wideband or other longer range wireless protocol, or may be determined by GPS location device or otherwise. In other embodiments, the wearable device interacts using RFID technology or cellular protocols. In some cases, the wearable device's location may be determined using triangulation techniques.

The next step, as represented by block 340, is in response to receiving confirmation that the user is under duress, to transmit a duress signal to an emergency system across a wireless network connection. The duress signal indicates that the user is under duress and indicates the location of the user. The emergency system is configured to alert police and/or security of the security incident.

An optional step, as represented by block 350, is to automatically cause the wearable device to enter an awake mode at a predetermined morning time and to automatically cause the wearable device to enter sleep mode at a second predetermined evening time.

Another optional step, as represented by block 360, is to periodically or in real-time determine the location of the wearable device using the location device, and to automatically cause the wearable device to enter awake mode when the wearable device moves within a geofenced area of interest, such as within a building or within a parking garage. It automatically causes the wearable device to enter sleep mode when the wearable device moves outside the geofenced area of interest.

Referring now to FIG. 4, another method for detecting a security incident and initiating an alarm protocol is illustrated generally from the perspective of the security system. The first step, as represented by block 410, is to establish an operative connection with at least one wearable device. As discussed above, the operative connection or operative coupling could be performed directly between the wearable device and a wireless router, server or otherwise, or may be established through one or more security station(s) of a distributed network of stations.

The next step, represented by block 420, is to receive, across the connection, a duress signal transmitted from the at least one wearable device. In some embodiments, the distress signal is encrypted so that it cannot easily be intercepted and hacked or modified.

The next step, represented by block 430, is to generate and transmit a request signal across the connection to the wearable device. The request signal requests confirmation from the user via the wearable device. The wearable device receives confirmation from the user using the wearable device, and transmits a confirmation signal back to the security system.

The next step, represented by block 440, is to receive the confirmation signal transmitted from the wearable device. The next step, represented by block 450, is to analyze the confirmation signal to determine whether the confirmation signal confirms that the user of the wearable device is under duress. For example, the confirmation signal may be encoded, for example, with an identification code corresponding to one or both of the initiating system or the wearable device itself, and that encoded identification may be decoded and confirmed to be valid prior to making a determination that the confirmation signal is valid.

The next step, represented by block 460, is in response to confirming the user is under duress, to contact security or police services and communicate the location of the user to the security or police services. The security system may have a direct or dedicated communication channel with the security personnel and/or the police for communicating alerts or messages indicating duress of wearable device users.

The next step, represented by block 470, is in response to failing to confirm the user is under duress, to stand down without contacting security or police services. If the confirmation signal does not arrive or if it is un-validated, then the security system may avoid sending duress signals to authorities.

Referring now to FIG. 5, a method for detecting a security incident and initiating an alarm protocol is illustrated generally from the perspective of the security system. The steps in FIG. 5 may be optional and may be stand-alone or related to one another. The first step, as represented by block 510, is handing off the operative connection with the wearable device. This hand-off may involve a first security station initiating operative coupling between the wearable device and a second security station proximate to the wearable device. In other embodiments, the wearable device and/or the second security station initiates the establishing of the operative coupling between the wearable device and the second security station. In certain embodiments, the operative couplings require a handshaking procedure prior to establishment of the operative coupling.

The next step, represented by block 520, is transmitting an emergency alert message to the security or police services. The security system transmits the message, and may do so over a dedicated communication channel or otherwise.

The next step, represented by block 530, is upon receiving the duress signal, maintaining the operative connection with the wearable device to continuously determine the location of the wearable device. In certain embodiments, when a duress situation has been confirmed, the wearable device is instructed to remain active until manually deactivated, or in some cases, is instructed to enter into a quiet mode (in the event it has sound functionality) or otherwise to minimize the chances that a perpetrator would notice the wearable device.

The next step, represented by block 540, is periodically updating security or police services of a most recently updated location of the wearable device. In some embodiments, once the wearable device has transmitted a duress signal, once the wearable device has transmitted a confirmation signal, or when the wearable device receives a control signal initiated by the security system of a disparate third device, the wearable device will periodically (and more frequently than normally) check its location and transmit its location back to the security system.

The next step, represented by block 550, is receiving a response from the security or police services that confirms they are in route to assist and transmitting a help-is-on-the-way signal to the wearable device. The police communication may come semi-directly from a police system or may be routed through the security system to the wearable device for communication to the user. In some embodiments, the wearable display changes colors to indicate to the user that the police are on the way, for example, the color blue could be displayed on the wearable device to indicate to the user that the police are responding to the duress alert.

Finally, the next step, as represented by block 560, is analyzing the confirmation signal including comparing it to previously stored confirmation password to determine that the confirmation signal effectively confirms the user is under duress, as discussed above.

Referring now to FIG. 6, a diagram illustrates an area enclosed by a geofence 605. The user 110 is moving within the geofence 605 while wearing the wearable device 106. The security system or emergency system 206 is operatively coupled with each of a number of security stations 610, which are distributed through the geofenced area 605. The security stations 610, in combination with the security system 206 form the distributed network 600. As the user moves around the geofenced area 605, the established operative coupling is transferred from security station to security station 610. In various embodiments, the operative coupling is a wireless connection such as Bluetooth or WiFi.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A wearable device configured for being worn on a body of a user and initiating an alarm protocol, the wearable device comprising:
a processing device;
a communication device operatively coupled with the processing device;
a user interface operatively coupled with the processing device;
a location device operatively coupled with the processing device;
a memory device operatively coupled with the processing device, the memory device comprising a non-transitory computer-readable storage comprising executable instructions that when executed by the processing device, cause the processing device to:
activate the wearable device based on the wearable device being located within a predefined geofenced area, wherein the wearable device is deactivated when the wearable device is located outside the predefined geofenced area;
receive user input via the user interface indicating that the user is under duress within the predefined geofenced area;
request confirmatory user input from the user via the user interface;
determine that the user is under duress within the predefined geofenced area by receiving no user tactile input within a predetermine period of time after the request for confirmatory user input;
determine a location of the user within the predefined geofenced area using the location device; and
in response to determining that the user is under duress within the predefined geofenced area, transmit a duress signal to an emergency system across a wireless network connection, the duress signal indicating that the user is under duress and indicating the location of the user within the predefined geofenced area, whereby the emergency system is configured to alert police and/or security of the security incident.

2. The wearable device of claim 1, wherein the executable instructions further cause the processing device to:
determine that the user is under duress by:
receiving initial confirmatory user input;
requesting further confirmatory user input from the user via the user interface;
receiving further confirmatory user input from the user via the user interface;
in response to receiving the further confirmatory user input from the user, confirming that the user is under duress.

3. The wearable device of claim 1, wherein receiving user input via the user interface indicating that the user is under duress comprises receiving user tactile input pressing a button a first instance.

4. The wearable device of claim 3, wherein receiving initial confirmatory user input via the user interface indicating that the user is under duress comprises receiving user tactile input pressing the button at least one additional instance within a predetermined time period of the first instance.

5. The wearable device of claim 4, wherein receiving further confirmatory user input from the user comprises receiving user tactile input pressing the button at least a third time.

6. The wearable device of claim 4, wherein receiving further confirmatory user input from the user comprises receiving no user tactile input within a predetermined period of time after the request for further confirmatory user input.

7. The wearable device of claim 1, wherein the executable instructions further cause the processing device to:
automatically cause the wearable device to enter an awake mode at a predetermined time; and
automatically cause the wearable device to enter a sleep mode at a second predetermined time.

8. The wearable device of claim 1, wherein the executable instructions further cause the processing device to:
determine the location of the wearable device using the location device;
automatically cause the wearable device to enter an awake mode when the wearable device moves within the predefined geofenced area; and
automatically cause the wearable device to enter a sleep mode when the wearable device moves outside the predefined geofenced area.

9. A wearable device configured for being worn on a body of a user and initiating an alarm protocol, the wearable device comprising:
a processing device;
a communication device operatively coupled with the processing device;
a user interface operatively coupled with the processing device;
a location device operatively coupled with the processing device;
a memory device operatively coupled with the processing device, the memory device comprising a non-transitory computer-readable storage comprising executable instructions that when executed by the processing device, cause the processing device to:

activate the wearable device based on the wearable device being located within a predefined geofenced area, wherein the wearable device is deactivated when the wearable device is located outside the predefined geofenced area;

receive user input via the user interface indicating that the user is under duress within the predefined geofenced area;

request confirmation from the user indicating whether the user is under duress or not via the user interface;

determine a location within the predefined geofenced area of the user using the location device;

wherein the processing device is configured to:
in response to receiving no user tactile input within a predetermined period of time after the request for confirmation indicating whether the user is under duress, transmit a duress signal to an emergency system across a wireless network connection, the duress signal indicating that the user is under duress and indicating the location of the user within the predefined geofenced area; and in response to receiving user input denying that the user is under duress, standing down without transmitting the duress signal, whereby the emergency system is configured to alert police and/or security of the security incident.

10. The wearable device of claim 9, wherein the processing device receives user input via the user interface either confirming the user is under duress or denying the user is under duress, wherein indicating that the user is under duress comprises receiving user tactile input pressing a button three times within a predetermined time period.

11. The wearable device of claim 10, wherein receiving confirmatory user input via the user interface indicating that the user is under duress comprises receiving user tactile input pressing the button a second three times within a second predetermined time period after the request.

12. The wearable device of claim 10, wherein receiving user input denying the user is under duress comprises receiving user tactile input pressing a second button a second three times within a second predetermined time period after the request.

13. The wearable device of claim 10, wherein receiving user input via the user interface either confirming the user is under duress or denying the user is under duress comprises:
within a predetermined period of time after the request, determining whether the user pressed the button a second three times or whether the user pressed another button three times;
wherein the processing device is configured to:
if the user pressed the button a second three times within the predetermined period of time, transmit the duress signal, and
if the user pressed the other button three times within the predetermined period of time, standing down without transmitting the duress signal.

14. The wearable device of claim 9, wherein the executable instructions further cause the processing device to:
automatically cause the wearable device to enter an awake mode at a predetermined morning time; and
automatically cause the wearable device to enter a sleep mode at a second predetermined evening time.

15. The wearable device of claim 9, wherein the executable instructions further cause the processing device to:

determine the location of the wearable device using the location device;
automatically cause the wearable device to enter awake mode when the wearable device moves within the predefined geofenced area; and
automatically cause the wearable device to enter sleep mode when the wearable device moves outside the predefined geofenced area.

16. A method for alerting an emergency system when a user wearing a wearable device is under duress, the method comprising:
activating the wearable device based on the wearable device being located within a predefined geofenced area, wherein the wearable device is deactivated when the wearable device is located outside the predefined geofenced area;
receiving user input via a user interface of the wearable device indicating that the user is under duress within the predefined geofenced area;
requesting confirmation from the user indicating whether the user in under duress or not via the user interface;
determining a location of the user within the predefined geofenced area using a location device of the wearable device;
receiving user input via the user interface either confirming the user is under duress within the predefined geofenced area or denying the user is under duress;
in response to determining that the that the user is under duress by receiving no user tactile input within a predetermined period of time after the request for confirmatory user input, transmitting, a duress signal to an emergency system from the wearable device and across a wireless network connection, the duress signal indicating that the user is under duress and indicating the location of the user within the predefined geofenced area, whereby the emergency system is configured to alert police and/or security of the security incident; and
in response to receiving user input denying that the user is under duress, standing down without transmitting the duress signal.

17. The method of claim 16, wherein the processing device receives user input via the user interface either confirming the user is under duress or denying the user is under duress, wherein indicating that the user is under duress comprises receiving user tactile input pressing a button three times within a predetermined time period.

18. The method of claim 17, wherein receiving confirmatory user input via the user interface indicating that the user is under duress comprises receiving user tactile input pressing the button a second three times within a second predetermined time period after the request.

19. The method of claim 17, wherein receiving user input denying the user is under duress comprises receiving user tactile input pressing a second button a second three times within a second predetermined time period after the request.

20. The method of claim 17, wherein receiving user input via the user interface either confirming the user is under duress or denying the user is under duress comprises:
within a predetermined period of time after the request, determining whether the user pressed the button a second three times or whether the user pressed another button three times;
if the user pressed the button a second three times within the predetermined period of time, transmitting the duress signal and if the user pressed the other button three times within the predetermined period of time, standing down without transmitting the duress signal.

21. The method of claim 16, further comprising:
automatically causing, by a processing device of the wearable device, the wearable device to enter an awake mode at a predetermined morning time; and
automatically causing, by a processing device of the wearable device, the wearable device to enter a sleep mode at a second predetermined evening time.

22. The method of claim 16, further comprising:
determining the location of the wearable device using the location device;
automatically causing, by a processing device of the wearable device, the wearable device to enter an awake mode when the wearable device moves within the predefined geofenced area; and
automatically causing, by a processing device of the wearable device, the wearable device to enter a sleep mode when the wearable device moves outside the predefined geofenced.

* * * * *